United States Patent [19]

Theodoulou et al.

[11] Patent Number: 4,839,671
[45] Date of Patent: Jun. 13, 1989

[54] SELECTABLE DENSITY CHARGE DEPOSITION PRINTING SYSTEM

[75] Inventors: Sotos M. Theodoulou, Bramalea; Christopher W. Thomson, Islington; Eric Vannerson, Don Mills; Wm. Keith Baker, Toronto; Alvin C. P. Sun, Etobicoke; Ken Hurley, Unionville, all of Canada

[73] Assignee: Delphax Systems, Randolph, Mass.

[21] Appl. No.: 253,138

[22] Filed: Oct. 4, 1988

[51] Int. Cl.$^4$ ............................................. G01D 15/00
[52] U.S. Cl. ..................................... 346/159; 346/154
[58] Field of Search ..................... 346/154, 158, 159; 364/518–521; 400/119; 101/DIG. 13; 358/300

[56] References Cited

U.S. PATENT DOCUMENTS 4,763,241  8/1988  Egawa et al. .................. 346/154
4,786,923  11/1988  Shimizu ........................... 346/154

Primary Examiner—Arthur G. Evans
Attorney, Agent, or Firm—Lahive & Cockfield

[57] ABSTRACT

Ionographic raster scan printing apparatus capable of printing with selectable print density utilizes an imaging drum having a surface movable in a process direction, a connector assembly for receiving an imaging module having a characteristic dot density determined by a set of control electrodes individually driven by clocked driver elements, a sensor module for generating density signals representative of the characteristic dot density, and a position encoder for generating position signals representative of the instantaneous position of the imaging drum surface. A scan clock synthesizer module generates activation signals for clocking the driver elements, the signals having a clock frequency proportional to an algebraic combination of the density signals and the position signals.

8 Claims, 3 Drawing Sheets

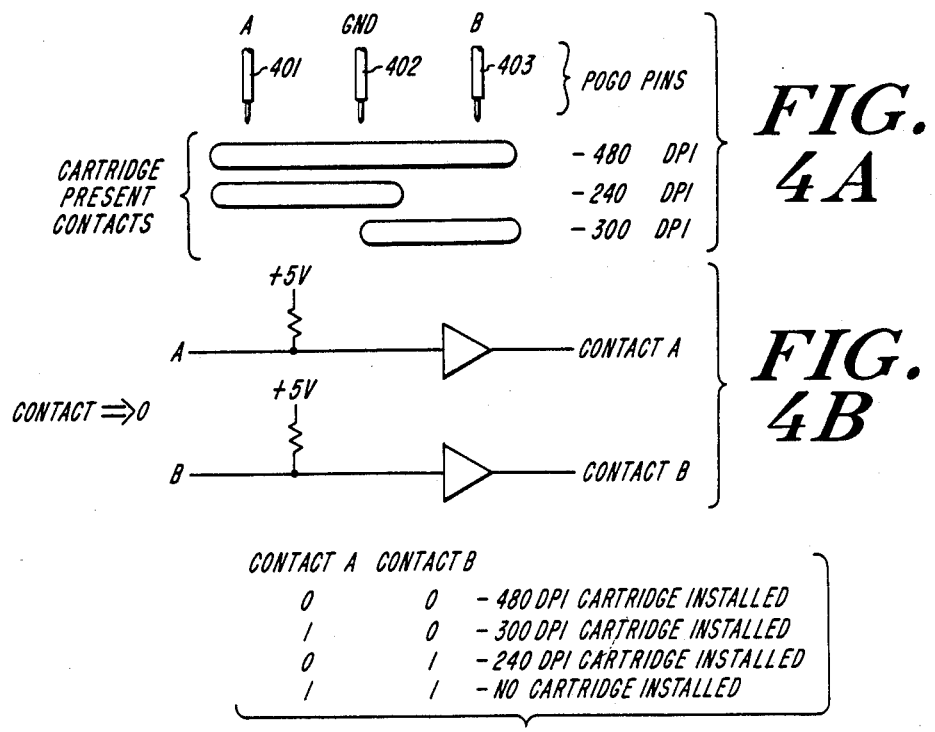
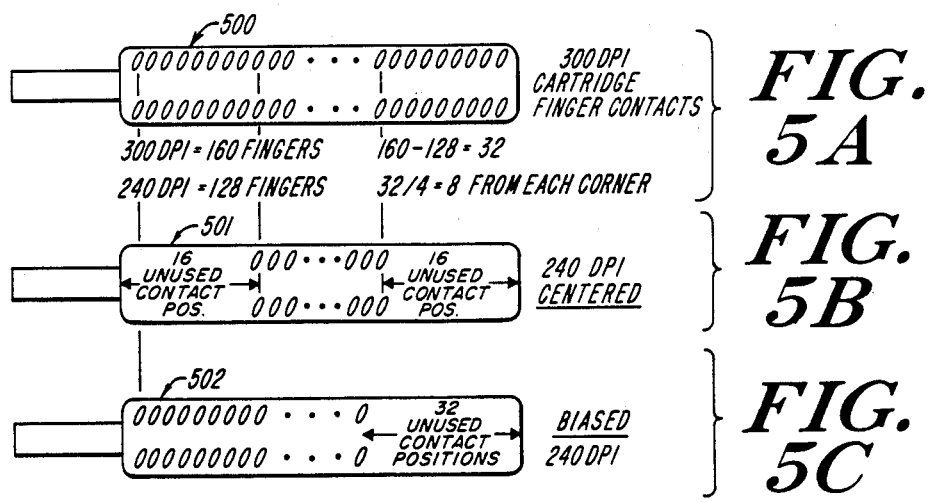

SELECTABLE DENSITY CHARGE DEPOSITION PRINTING SYSTEM

BACKGROUND OF THE INVENTION

This invention relates generally to systems for charge deposition printing and, more particularly, relates to charge deposition printing apparatus capable of printing with selectable print density.

Charge deposition printers convert electronic input signals into a corresponding raster print output, utilizing a charge deposition printer head (also referred to as an imaging module or cartridge) having a spaced array of charge-generating chambers or guns. The printer head is positioned opposite a rotating print drum, and RF drive signals are applied along conduits to the guns to provide a charge-generating field for each gun. Control signals are sequentially applied to actuate those guns necessary to generate a desired latent image charge distribution on the drum. The charge on the drum is used to retain toner for subsequent transfer to a recipient sheet pressed against the rotating drum, thereby providing a desired print output image, corresponding to the input signals, on the recipient sheet.

The imaging module is typically a replaceable element, and the array of charge deposition chambers is controlled by electrodes which are individually driven by clocked driver elements to generate the charge image on the surface of the rotating imaging drum. Charge deposition printing processes and apparatus are disclosed in commonly owned U.S. patent application Ser. No. 07-063,155, incorporated herein by reference. Charge deposition printers are widely utilized, and provide advantages in resolution, throughput and reliability.

Conventional charge deposition printers, however, can generate print output having only a single resolution (also referred to as print density or dot density). Print resolution in the process direction—i.e. the direction of rotation of the imaging drum—is a function of the resolution of position encoding elements, while print density in the direction transverse to the process direction is determined by the group density of the charge deposition chambers in the imaging module. The resolution of the position encoding elements is typically fixed, and group density is a fixed, characteristic density for a given imaging module.

The print industry has long recognized a need for charge deposition printing apparatus capable of printing with selectable resolution or density, without the necessity of extensive electromechanical reconfiguration, and attendant downtime and loss of throughput. Plural host computers, for example, may each support different levels of print resolution or density, and if utilized in conjunction with conventional charge deposition printing apparatus, would necessitate either the expense of two separate printers, or time-consuming reconfiguration of a single dedicated printer. Moreover, various print applications may require differing levels of resolution even within the same document, such as for text and graphics fields.

Accordingly, there exists a need for charge deposition printing apparatus capable of printing with selectable print density without necessitating extensive electromechanical reconfiguration.

It is therefore an object of the invention to provide charge deposition printing apparatus capable of printing with selectable print density or resolution.

It is a further object of the invention to provide such charge deposition printing apparatus capable of attaining multiple print resolution levels without extensive electromechanical reconfiguration.

Other general and specific objects of the invention will in part be obvious and will in part appear hereinafter.

SUMMARY OF THE INVENTION

The foregoing objects are attained by the invention, which provides charge deposition raster scan printing apparatus and methods for printing with selectable print density, the apparatus including an imaging drum having a surface movable in a predetermined process direction, and a connector assembly for receiving a replaceable imaging module having a characteristic dot density corresponding to a set of control electrodes individually driven by clocked driver elements.

The invention also includes sensor elements, in association with the imaging assembly, for sensing the characteristic dot density of the imaging module and generating density signals representative of the characteristic dot density; and position encoder elements, in association with the imaging drum, for generating position signals representative of the instantaneous position of the imaging drum surface.

A scan clock synthesizer module, responsive to the density signals and the position signals, is provided for synthesizing clocked activation signals for clocking the driver elements. These clocked activation signals have a clock frequency proportional to an algebraic combination of the density signals and the frequency of the position signals. A raster image processor/controller, responsive to the density signals, is provided for configuring raster image data to the dot density represented by the density signals. Print density in the process direction is therefore selectable by the clock frequency, while print density in the direction transverse to the process direction is a function of the characteristic dot density of the replaceable imaging module being utilized.

In one aspect of the invention, the raster image processor/controller includes elements for controlling velocity of motion, in the process direction, of the imaging drum surface. In another aspect of the invention, the scan clock synthesizer elements can include a phase-locked loop module for synthesizing the clocked activation signals in response to a detected frequency of the position signals.

The phase-locked loop (PLL) module can include a voltage-controlled oscillator (VCO) which generates a signal at a first frequency, and frequency divider elements for dividing this first frequency by selected integer or integers to produce signals at a second and possibly a third frequency. The PLL module can further include a phase comparator for generating an output proportional to the phase difference between the position encoder output and the second-frequency signal, and a loop filter to attenuate high-frequency components of the phase comparator output and pass low-frequency components to the VCO input.

The invention accordingly comprises the steps and apparatus embodying features of construction, combinations of elements and arrangements of parts adapted to effect such steps, as exemplified in the following detailed disclosure, and the scope of the invention is indicated in the claims.

BRIEF DESCRIPTION OF THE DRAWINGS

For a fuller understanding of the nature and objects of the invention, reference should be made to the following detailed description and the accompanying drawings, in which:

FIG. 4A, 4B, 4C are schematic diagram depicting cartridge sensor elements utilized in the embodiment of FIG. 1;

FIGS. 5A, 5B, 5C are schematic diagrams depicting certain cartridge finger contact configurations utilized in accordance with the invention.

DESCRIPTION OF PREFERRED EMBODIMENTS

Figure 1:
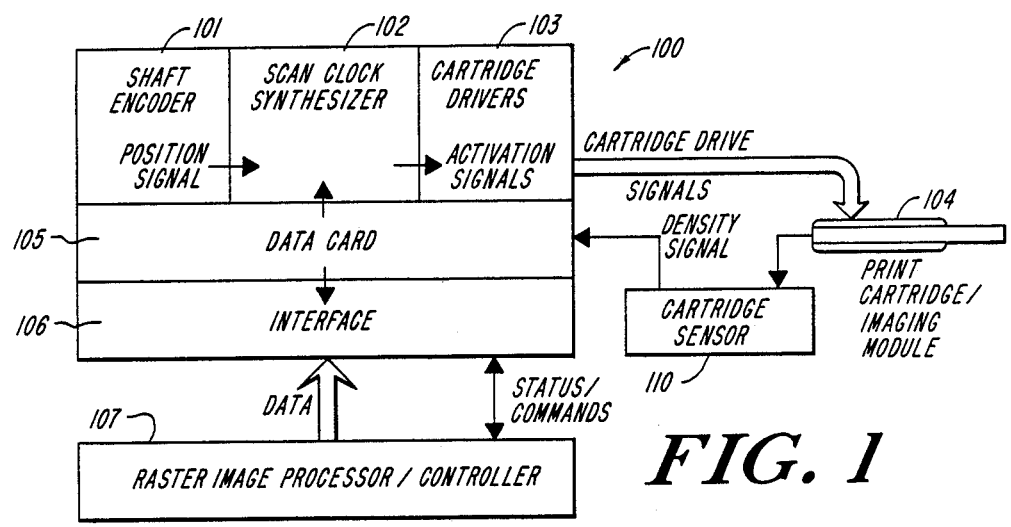
FIG. 1 is a schematic diagram depicting ionographic print engine architecture according to the invention.

FIG. 1 is a schematic diagram depicting ionographic printing apparatus 100 according to the invention. The shaft position encoder 101, mounted in proximity to the shaft of a conventional imaging drum (not shown in FIG. 1) generates position signals—i.e. clock pulses—and transmits the position signals to the scan clock synthesizer module 102. These position signal pulses represent the instantaneous position of the imaging drum surface.

The scan clock synthesizer module 102 reads the density signals received from the data card 105 and associated cartridge sensor 110, representative of the selected dot density to be printed, and the position signals generated by the shaft encoder 101. In response to these signals, the scan clock synthesizer module 102 synthesizes equally spaced clocked activation signals for clocking the cartridge driver elements 103. These clocked activation signals have a clock frequency proportional to an algebraic combination of the density signals and the position signals, as discussed in greater detail hereinafter.

In one embodiment of the invention, the dot density signals, representative of the characteristic dot density of the print cartridge or imaging module, are provided to the data card 105 by sensing elements on the print cartridge 104. These sensing elements can be, for example, encoded contacts or tactile elements on, or interacting with, print cartridge 104.

The data card 105 also transmits dot density signals through the print engine interface 106 to the raster image processor/controller (RIP) 107, which also receives control and data signals from the host computer, so that raster image data for the host computer can be formatted in accordance with known methods for the selected dot density represented by the density signals generated by the cartridge sensor 110.

The illustrated print engine operates as follows: The operator inserts a print cartridge 104 of a selected dot density, which may, for example, be 240 or 300 dots per inch (DPI). Responsive to the density signal generated by the cartridge sensor 110, the data card 105 configures the print system 100 to print at the selected print density. The dot density information is also transmitted to the RIP 107 for verification of compatibility with its density configuration.

Because the cartridge driver activation signals are synthesized as a function of the selected dot density, and because the driver signals are equally spaced in accordance with the shaft encoder signals (representative of movement of the imaging drum), proper operation of the printing apparatus 100, particularly with respect to dot placement accuracy, is also independent of process speed of the imaging drum surface. Thus, the process speed can be pre-set, or can be slaved to commands from the RIP 107. Print density in the process direction is selectable by the clock frequency, and print density in a direction transverse to the process direction is selectable by the characteristic dot density of the print cartridge 104.

Figure 2:
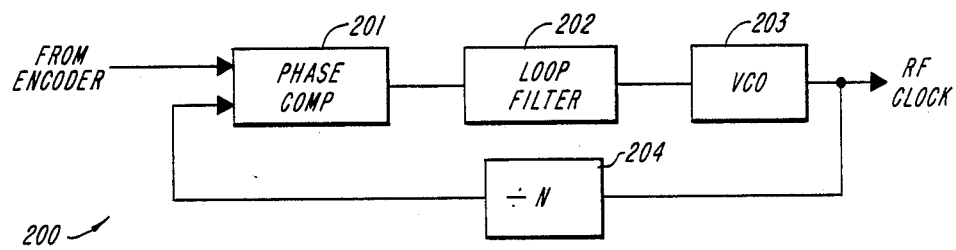
FIG. 2 is a schematic diagram depicting a phase-locked loop for generating RF clock signals in accordance with the invention.

FIG. 2 is a schematic diagram depicting a phase-locked loop (PLL) for generating RF clock signals in accordance with the invention. The PLL consists of a phase comparator section 201, loop filter module 202, voltage-controlled oscillator (VCO) module 203, and divider section 204. The phase comparator 201 reads the output of the divider 204 and the position signal generated by the position encoder, and generates an output signal, which in turn is read by the loop filter 202. The loop filter 202 integrates this signal and drives a VCO 203 which in turn generates an output at a first frequency. The VCO output signal can then be processed in a conventional manner to generate RF clock (CLK) signals, and also fed back to the phase comparator 201 following division by a selected positive integer N in divider 204.

In accordance with the invention, proper activation of the print cartridge is achieved when the following equation is satisfied:

$$N = 2\pi r\, p\, d/m \quad \text{(Eq. 1)}$$

where
r = drum radius in inches,
p = number of RF drive lines in the cartridge,
d = dot density in DPI, and
m = encoder transitions per revolution of drum.
Given typical values of
r = 1.9685
p = 16,
d = 300, and
m = 3710,
N is approximately 16. Reducing d to 240 DPI, however, gives N = 12.8, a non-integer value. Because non-integer frequency division is generally difficult to implement, an alternative PLL configuration, depicted in FIG. 3, is preferred.

Figure 3:
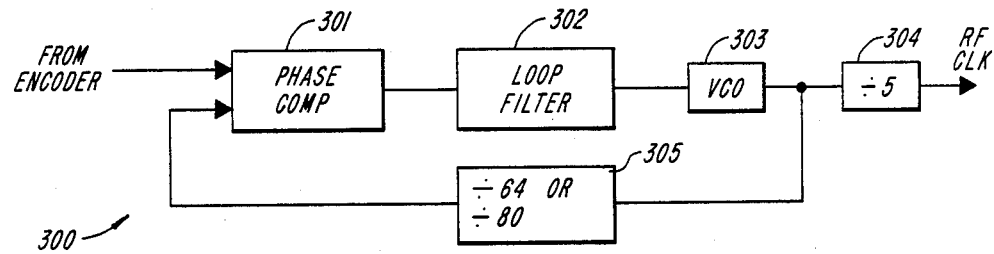
FIG. 3 is a schematic diagram depicting an alternative embodiment of a phase-locked loop for generating RF clock signals in accordance with the invention.

The PLL 300 illustrated in FIG. 3 for generating RF clock signals in accordance with the invention is similar to that discussed above in connection with FIG. 2. The PLL includes a phase comparator section 301, loop filter module 302, and VCO module 303. The phase comparator 301 reads the position signal generated by the position encoder, and generates an output signal, which in turn is read by the loop filter 302. The integrator/amplifier 302 integrates the output signal and drives VCO 303, which generates a signal having a first frequency.

Unlike the PLL illustrated in FIG. 2, however, PLL 300 contains two divider sections 304 and 305. In the illustrated embodiment, divider 304 divides the output of VCO 303 by five to generate RF CLK signals, and divider 305 divides the output of VCO 303 by either 64 or 80, depending upon the received cartridge sensor signal representative of the selected dot density, to provide a feedback signal transmitted to phase comparator 301.

The PLL configuration depicted in FIG. 3 avoids the requirement of non-integer frequency division. Moreover, the division ratio can be quickly and easily switched between 64 and 80, under software control, for printing at 240 or 300 DPI, respectively.

A number of cartridge sensor configurations can be utilized in conjunction with the embodiment of FIG. 1 to generate density signals. FIG. 4 is a schematic diagram depicting a preferred cartridge sensor 400 utilized in the embodiment of FIG. 1. The cartridge sensor is composed of three pressure responsive "cartridge-present" sensors, which can be, for example, conventional two-position pogo pins 401, 402, 403 designed to interact with external indicator flats, projections, or other contacts incorporated into conventional charge deposition printer cartridges. Pogo pins 401, 402, 403 are coupled to lines A, GND, and B, respectively.

As indicated schematically in FIG. 4B, the pogo pins 401, 402, 403 make electrical connection from lines A, B and GND, respectively, to the conductive cartridge present contacts. It is the presence or absence of electrical connection from A to GND, and B to GND, which signals the presence or absence of the cartridge, and if present, what type of cartridge is selected.

In accordance with the invention, when no print cartridge is installed, all pogo pins remain in the extended, no-contact position, and lines A and B are pulled up to +5 volts, or logic ONE, by the pull-up circuit configuration schematically illustrated in FIG. 4B. As indicated in FIG. 4C, the illustrated embodiment of the data card interprets the logic ONE state on both lines A and B as indicating the absence of a print cartridge.

When a 480 DPI print cartridge constructed in accordance with the invention is installed, having indicator flats or projections specifically configured for the 480 DPI setting, the indicator flats or projections cause all pins 401, 402, 403 to be depressed, resulting in a logic ZERO on both lines A and B. The data card interprets logic ZERO on both lines A and B as indicating the presence of a 480 DPI cartridge, causing the printing system to be configured for 480 DPI printing in a manner discussed above in connection with FIG. 1.

Similarly, a 240 DPI cartridge constructed in accordance with the invention includes indicator flats or projections positioned so as to depress pins 401 and 402—but not pin 403—upon installation, resulting in a logic ZERO on line A and a logic ONE on line B. This condition is indicative of the presence of a 240 DPI print cartridge, and the system will be configured accordingly.

Installation of a 300 DPI print cartridge having corresponding indicator flats or projections causes pins 402 and 403 to be depressed, generating a logic ONE on line A, and a logic ZERO on line B. This condition signals the presence of a 300 DPI cartridge, causing the data card to configure the printing system for 300 DPI printing.

Those skilled in the art will appreciate that a reduced density print cartridge will have fewer finger contacts than does a higher density cartridge. Thus, while a 300 DPI cartridge will typically have 160 finger contacts, a 240 DPI cartridge will require 32 fewer, or 128 finger contacts. Finger contact configurations utilized in accordance with the invention are illustrated in FIG. 5.

FIG. 5A depicts finger contact configuration for a 300 DPI cartridge 500, utilizing 160 finger contacts. FIGS. 5B and 5C respectively depict 240 DPI cartridges 501, 502, having "centered" and "biased" finger contact configurations. In particular, the finger contacts for a 240 DPI cartridge can be centered within the positions occupied by the 300 DPI finger contacts, as depicted in FIG. 5B, or biased to one side of the 300 DPI finger contact positions, as illustrated in FIG. 5C.

The centered and biased configurations each offer advantages in construction and operation. A centered configuration of the 128 finger contacts utilized in a 240 DPI cartridge, as depicted in FIG. 5B, renders the 240 DPI cartridge symmetrical in construction. In a centered configuration, however, the data card or controller, which can generate drive signals for both 160 fingers (at 300 DPI) and 128 fingers (at 240 DPI), must provide sixteen unimaged ("dummy") dots on each side of the image to "skip" the 32 finger drivers which are unused when a 240 DPI cartridge is installed.

Unimaged dots increase data rate requirements. In particular, a 300 DPI raster scan line is typically 2560 dots (depending upon line length), while a 240 DPI raster scan line is 2048 dots. Printing with a 240 DPI centered cartridge necessitates a data rate equal to that utilized for a 300 DPI cartridge, resulting in a 25% increase in the data rate required for a 240 DPI centered cartridge.

This increase in required data rate can be reduced to $12\frac{1}{2}\%$ by using a scan line length of $(2048 + 16 \times 16)$ dots to bypass the unused 16 fingers on the left side of the array. Moreover, the increase in controller-to-data card data rate can be eliminated entirely by using a 2048 dot raster scan line and utilizing the data card for loading the data and shifting the data over the unused 16 fingers on the left side of the array.

Alternatively, the 240 DPI cartridge finger contacts can be biased to one side of the 300 DPI finger contact positions, as illustrated in FIG. 5C. The 32 unused contact positions would not be addressed by the data card, which would adjust raster line length for the 240 DPI cartridge. Consequently, there would be no need to generate unimaged dots. Biasing the 240 DPI finger contacts, however, complicates data card requirements, because the data card must provide different raster line lengths for 240 DPI and 300 DPI, respectively A centered 240 DPI finger contact arrangement, conversely, necessitates an increased data rate, but eliminates the data card enhancements required for transmitting different raster line lengths. In one embodiment of the invention, therefore, selected finger drivers for a centered 240 DPI cartridge are bypassed or "tapped" to eliminate the unimaged dots, as illustrated in FIG. 6.

Figure 6:
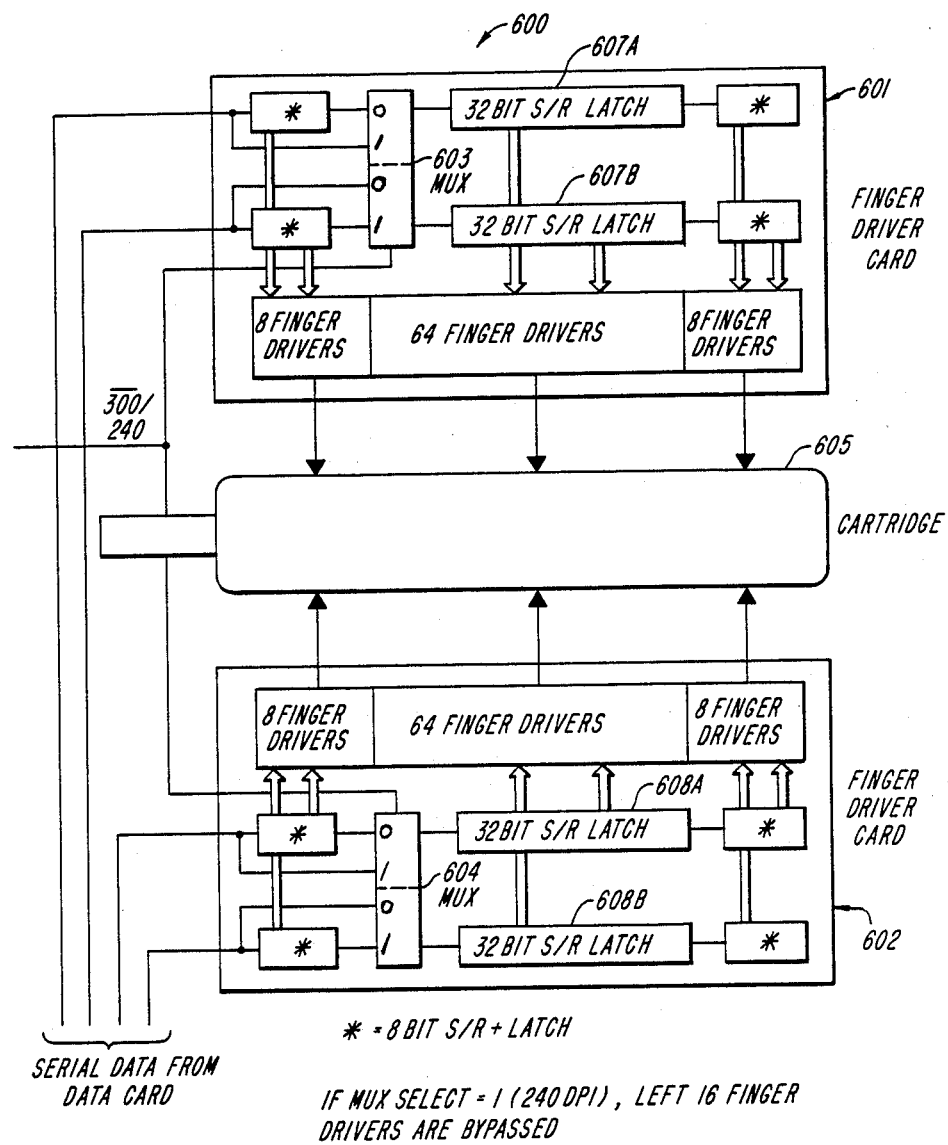
FIG. 6 is a schematic diagram depicting finger driver circuitry in accordance with the invention.

FIG. 6 is a schematic diagram depicting finger driver circuitry 600 utilized in conjunction with a centered 240 DPI cartridge configuration. The illustrated circuitry utilizes two finger driver cards 601, 602. Each finger driver card 601, 602 has a respective multiplexer (MUX) 603, 604, and two 8-bit S/R and Latch modules 607A, 607B, 608A, 608B. The MUXs 603, 604 are controlled by a digital MUX SELECT signal, to select 240 DPI or 300 DPI printing modes, depending upon the characteristic dot density of the installed cartridge 605.

In the illustrated circuitry, when MUX SELECT=1, the left 16 finger drivers are bypassed.

In a preferred method for implementing selectable 300/240 DPI printing, every raster scan line transmitted to the print cartridge has sufficient data to specify a 300 DPI length raster line, typically 2560 dots. As discussed above, this requires a data rate increase of 25% over that required for a conventional 240 DPI cartridge (2048 dots). In a selectable 240/300 DPI system, this increase is insignificant, because the 2560 dot/line rate must be provided for 300 DPI operation. A printer constructed in accordance with the invention has been tested at 120 pages per minute (PPM) at 240 DPI.

It will thus be seen that the invention efficiently attains the objects set forth above, among those made apparent from the preceding description. In particular, the invention provides charge deposition printing apparatus capable of printing with selectable print density without necessitating extensive electromechanical reconfiguration.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In an ionographic raster scan printing apparatus including an imaging drum having a surface movable in a predetermined process direction, and a connector assembly for receiving a replaceable imaging module having a characteristic dot density corresponding to a set of control electrodes individually driven by clocked driver elements, a system for printing with selectable print density, the system comprising
   A. sensor means, in association with the imaging assembly, for sensing the characteristic dot density of the imaging module and for generating density signals representative of the characteristic dot density,
   B. position encoder means, in association with the imaging drum, for generating position signals representative of the instantaneous position of the imaging drum surface,
   C. scan clock synthesizer means, responsive to said density signals and said position signals, for synthesizing clocked activation signals for clocking the driver elements, said clocked activation signals having a clock frequency proportional to an algebraic combination of said density signals and said position signals, and
   D. raster image processor/controller means, responsive to said density signals, for configuring raster image data to the dot density represented by the density signals,
   E. whereby print density in the process direction is selectable by said clock frequency, and print density in a direction transverse to the process direction is selectable by the characteristic dot density.

2. A system according to claim 1, wherein said raster image processor/controller means includes means for controlling velocity of motion, in the process direction, of the imaging drum surface.

3. A system according to claim 1, wherein said scan clock synthesizer means includes phase-locked loop means for synthesizing said clocked activation signals in response to a detected frequency of said position signals 4. A system according to claim 3, wherein said phase-locked loop means includes
   A. voltage-controlled oscillator means for generating a first signal having a first frequency,
   B. frequency divider means, in circuit with said voltage-controlled oscillator means, for receiving said first signal having said first frequency and dividing said first frequency by at least a first selected integer quantity to produce at least a second signal having a second frequency,
   C. phase comparator means, in circuit with said frequency divider means and said position encoder means, for receiving said at least second signal and said position signals, and generating a phase comparator output signal proportional to phase differences between said at least second signal and said position signals, and
   D. loop filter means, in circuit with said phase comparator means and said voltage-controlled oscillator means, for attenuating high-frequency components of said phase comparator output signal and passing low-frequency components of said phase comparator output signal to said voltage-controlled oscillator means.

5. In an ionographic raster scan printing process including the steps of moving an imaging drum surface in a predetermined process direction, and receiving a replaceable imaging module having a characteristic dot density corresponding to a set of control electrodes individually driven by clocked driver elements, the improvement comprising the steps of
   A. sensing the characteristic dot density of the imaging module,
   B. generating density signals representative of the characteristic dot density,
   C. generating position signals representative of the instantaneous position of the imaging drum surface,
   D. synthesizing clocked activation signals, having a clock frequency proportional to an algebraic combination of said density signals and said position signals, for clocking the driver elements, and
   E. responding to said density signals to configure raster image data to the dot density represented by the density signals,
   F. whereby print density in the process direction is selectable by said clock frequency, and print density in a direction transverse to the process direction is selectable by the characteristic dot density.

6. In a process according to claim 5, the further improvement comprising the step of controlling velocity of motion, in the process direction, of the imaging drum surface.

7. In a process according to claim 5, the further improvement wherein the synthesizing step includes the step of configuring a phase-locked loop for synthesizing said clocked activation signals in response to a detected frequency of said position signals.

8. In a process according to claim 7, the further improvement wherein the step of configuring a phase-locked loop includes the steps of
   A. generating a first signal having a first frequency, B. dividing said first frequency by at least a first selected integer quantity to produce at least a second signal having a second frequency,
C. generating a phase comparator output signal proportional to phase differences between said at least second signal and said position signals, and
D. attenuating high-frequency components of said phase comparator output signal and passing low-frequency components of said phase comparator output signal to said voltage-controlled oscillator means.

* * * * *